Patented Nov. 4, 1952

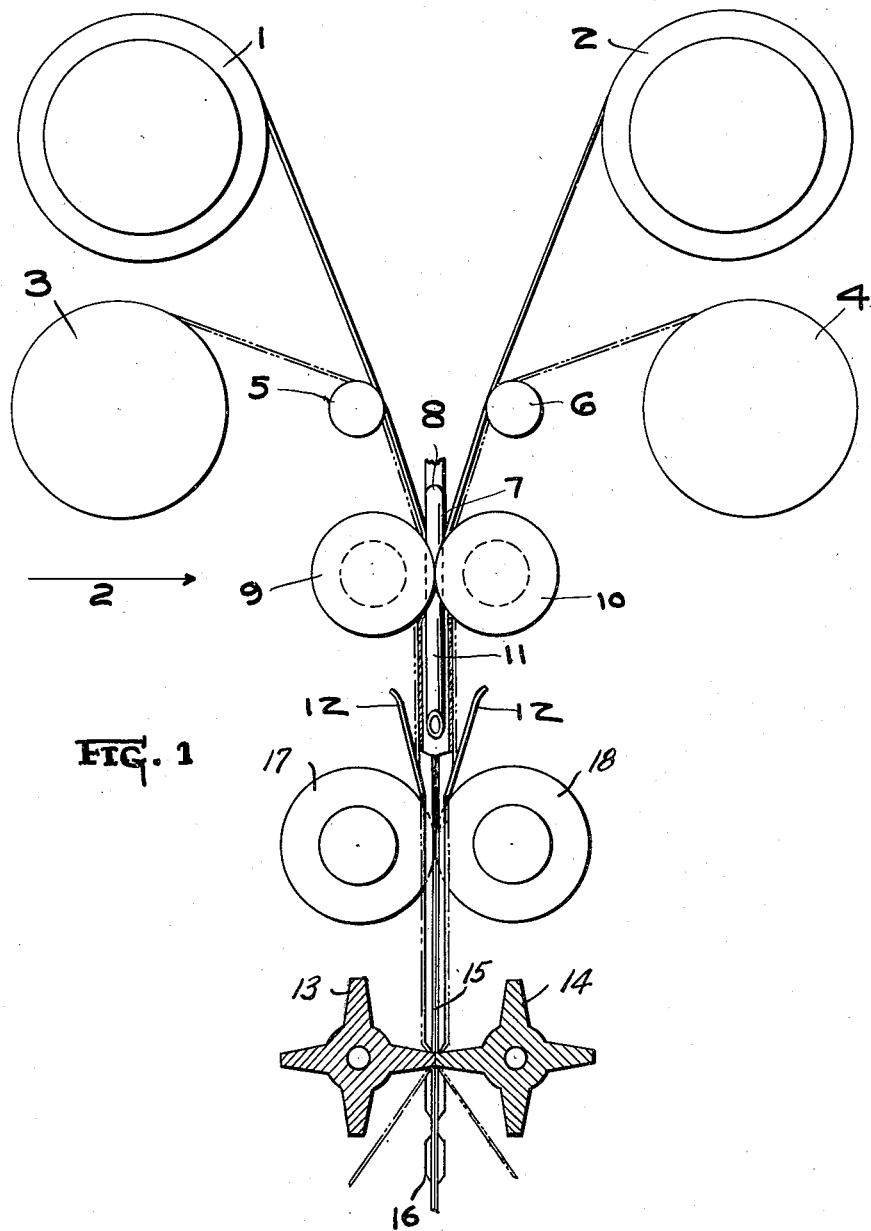

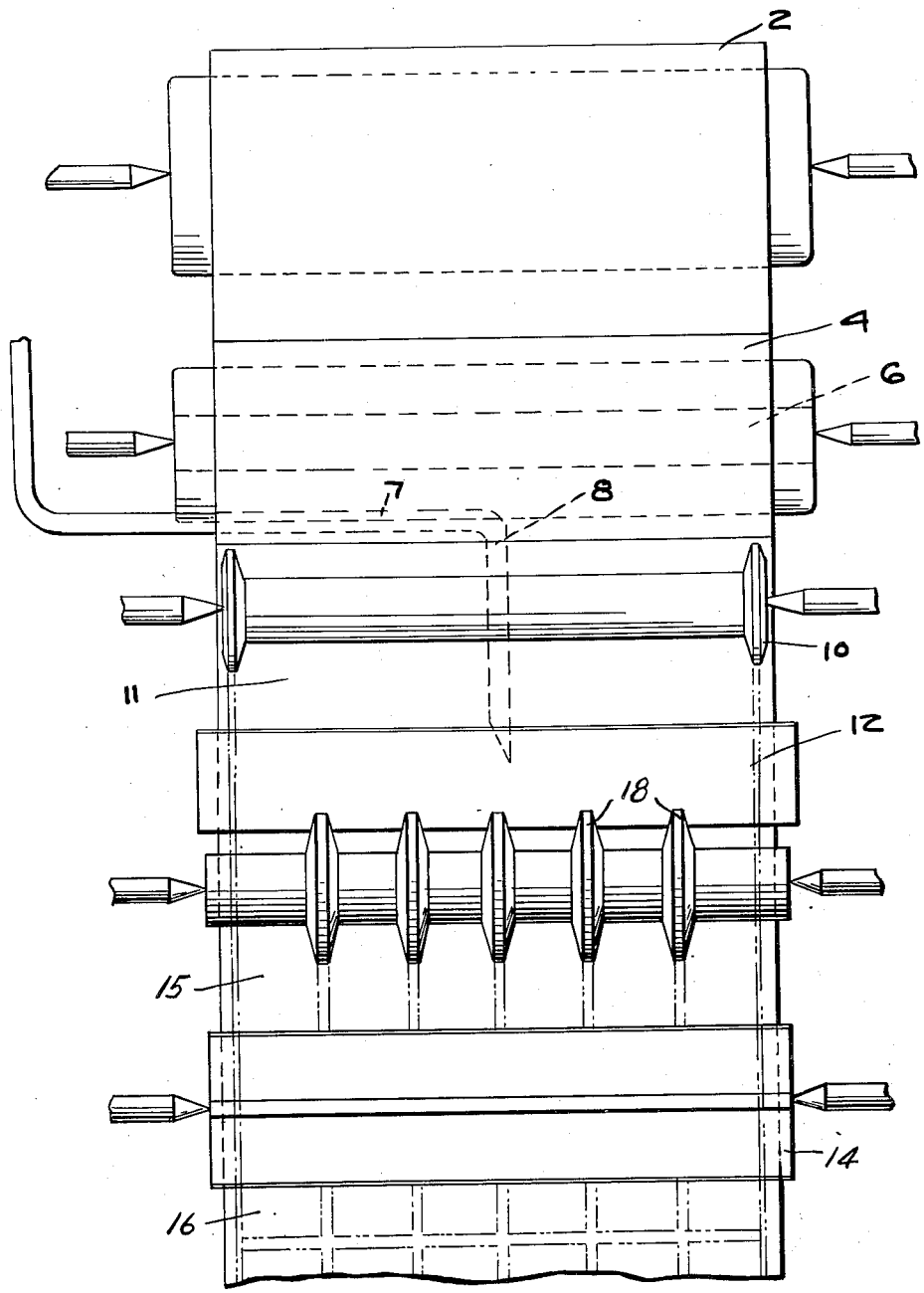

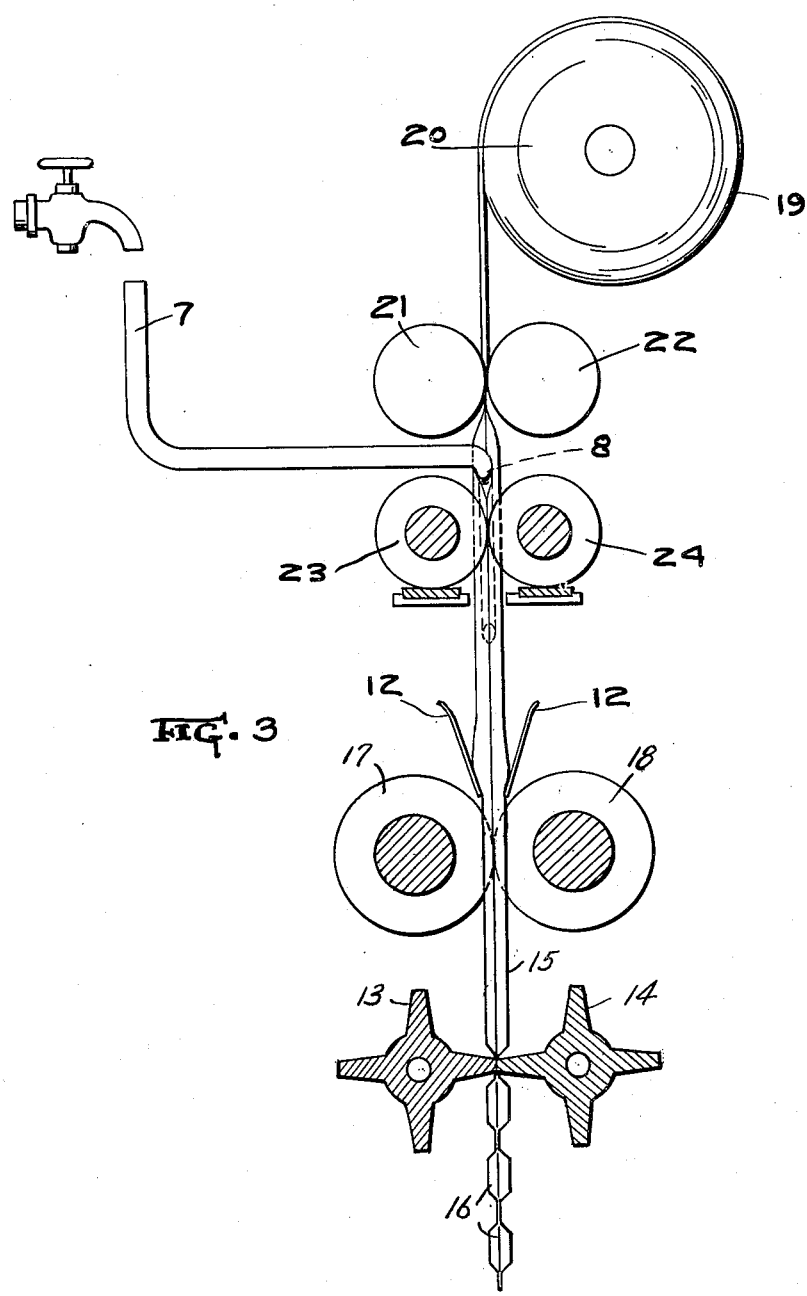

2,616,232

UNITED STATES PATENT OFFICE 2,616,232

METHOD AND APPARATUS FOR MANUFACTURE OF AMPOULES AND OTHER CONTAINERS

Felix Meyer, Brussels, Belgium, assignor to Sterling Drug Inc., New York, N. Y., a corporation of Delaware Application September 14, 1948, Serial No. 49,142
In Great Britain October 21, 1947

8 Claims. (Cl. 53—10)

This invention relates to the manufacture and filling of fluid receptacles such as medical ampoules, bottles including milk bottles especially for babies, vials, receptacles for liquid foodstuffs such as salad dressing, soups and sauces; and receptacles for liquid beauty preparations and toilet requisites. In this specification the generic expression "container" is used to include all such receptacles.

Taking medical ampoules as an example, these have hitherto generally speaking been made of glass which up to a point has proved satisfactory. It is well known however that glass ampoules suffer from one or two inherent disadvantages. For example they are rather fragile, they are sometimes difficult to open without splintering, and they are not usually capable of being completely filled and closed without any air inside. Containers for other liquids have been in the past made from a variety of substances including metal and glass. Of recent years it has been from time to time proposed to use a synthetic thermoplastic material such as polyethylene, hereinafter called polythene, in the manufacture of liquid containers. As an example of this technique there is a process for the production of protective-sealed containers for liquids, pastes or powders, accomplished by extruding through a suitable orifice in a substantially downwards direction a tube of a thermoplastic synthetic resin composition which is solid at room temperature and at the same time carrying out a cycle of operations consisting of sealing a portion of the said tube, feeding through an aperture circumscribed by the said orifice the liquid, paste or powder into the interior of the tube in which the pressure is controlled through a vent also circumscribed by the said orifice; and again sealing a portion of this tube above or behind the liquid, paste or powder, said sealing operations being accomplished by nipping the tube with jaws under conditions such that the resin composition so brought together is in a plastic state.

The present invention is concerned with the manufacture and filling of containers made of suitable synthetic thermoplastic material and one object of the invention is to provide an improved method of manufacturing and filling containers in such a way that the containers are substantially completely filled with liquid, no air being present. In this connection steps should be taken to drive dissolved gases out of the liquid before filling the containers.

It should be here mentioned that the synthetic thermoplastic material selected should be solid at room temperature so that a satisfactory practical container may be produced, it should be substantially inert, that is to say it should not have any deleterious action on the contents, it should be flexible and as far as possible it should be impermeable to water vapour. At present all such thermoplastics are to a certain extent permeable to water vapour but some are better than others and when filling containers with volatile liquids this factor should be particularly borne in mind. Examples of two suitable synthetic thermoplastic materials are polythene and chlorinated rubber which give very satisfactory results. Alternatively thermoplastic cellulosic materials may be used such as ethyl cellulose or cellulose acetate or other suitable synthetic thermoplastic materials including polyvinyl compounds such as polyvinyl ester including polyvinyl chloride with or without polyvinyl acetate. The expression "synthetic thermoplastic material" as used in this specification therefore includes only nonmetallic thermoplastic materials having the properties specified above which are suitable for formation into tapes or tubes to be manufactured into liquid containers.

According to the present invention there is provided a method of making and filling liquid containers of the kind referred to, comprising feeding liquid into a tube of synthetic thermoplastic material which is closed at the lower end thereof, and then sealing the tube transversely at spaced positions in order to divide the tube into a number of individual containers, each successive transverse sealing operation being effected below the surface of the liquid in the tube so that excess liquid from one container is forced out into the next container above. It may here be mentioned that the term liquid is used in this specification in a broad sense as opposed to solids in powder or granular form which generally speaking cannot be obtained free from air. The expression liquid as employed in this specification includes fluids such as water, solutions, suspensions, alcoholic solutions, more viscous fluids such as oils, syrups and gels and also thicker fluids such as pastes.

The method of making and filling containers in accordance with the invention is preferably carried out as a continuous operation comprising the steps of moving a tube of synthetic thermoplastic material in a downward direction, closing the lower end of the tube, feeding liquid into the tube, and dividing the tube into individual completely filled containers by sealing the tube transversely thereof successively at a number of spaced positions, each sealing operation being above the previous seal and below the liquid surface so that excess liquid from one container is forced out into the container above, whereby completely filled containers are produced.

Going a stage further, the complete method of forming the tube, filling it with liquid and then forming the individual containers may be carried out as a sequential series of operations. According to one such method the tube may be extruded in accordance with known technique, and according to another method the tube may be formed from one or more than one tape of synthetic thermoplastic material. As an example, a method of making and filling containers using an extruded tube will hereinafter be described in more detail.

In accordance with this feature of the invention a tube of synthetic thermoplastic material may be produced by extrusion and the lower end of the tube may be sealed, for example by heated star shaped rollers or by other suitable means. In this way the tube may be formed continuously in an endless length by forcing out the heated plastic mass through an extrusion orifice. The inner die forming the central wall of the orifice, may be provided with an aperture therein and through this aperture liquid may be fed into the tube continuously or intermittently as desired. It is not necessary in accordance with this invention to feed in measured quantities of liquid in view of the fact that transverse sealing to divide the tube into the individual containers is effected below the surface of the liquid, the amount of liquid in each container being regulated by other means such as the speed of formation of the tube and the frequency of operation of the transverse sealing means. In accordance with this technique filled containers with, if desired, substantially sterile contents, may be produced in considerable numbers. If, for example, the tube is formed at a speed of one meter per minute and if it then travels between two heated fluted rollers which effect a seal transversely of the tube every two centimeters, then fifty filled sealed, sterile containers may be produced per minute, each container having substantially the same amount of contents as any other.

In the above example a single die orifice is used to produce a single tube which is then filled and divided into individual containers as described. Going a stage further, means may be provided to divide the tube longitudinally into two or more tubes by sealing longitudinally to produce multiple lines of additional containers. This longitudinal sealing is preferably done after filling the tube and before or after the transverse sealing. The invention may also be carried out in such a manner that several tubes travel adjacent to one another, and different liquids may be passed into each tube. This technique may be particularly useful in the case of medicaments and also for some foodstuffs that require mixing immediately before use.

According to the above technique therefore involving the use of an extruded tube there is provided a method of making filled containers comprising forming by downward extrusion a tube of synthetic thermoplastic material, closing the lower end of the tube, feeding the liquid contents into the tube and then dividing the filled tube into a number of individual containers by transverse sealing in such a way that the excess liquid from one container is forced out during transverse sealing into the next container above. The transverse sealing is effected by heat which melts and seals together the opposite sides of the tube so that as the top of a formed container is sealed off in the same operation, the bottom of the next container above is sealed, the excess liquid from the formed container being pushed out during the sealing operation into the container above.

It will be understood that instead of using an extruded tube of synthetic thermoplastic material it is possible to start from one, two or more tapes of synthetic thermoplastic material which may be used in long lengths and joined together longitudinally by sealing to make a tube similar to the extruded tube described above but having seams or joins therein. The tape or tapes may be shaped into a tube by moving their longitudinal edges past a device which fuses them together by heat. In possibly the most simple arrangement two tapes may be employed, joined longitudinally along the two edges; but it will be realized that if desired three, four or even more tapes could be used to form containers of special size or shape, for example approximately square, rectangular or triangular in cross-section.

In the preferred arrangement using tapes of the synthetic thermoplastic material two tapes are used, these tapes being continuously unwound from spools and passed over heated rollers shaped and adapted to seal the side edges of the tapes together longitudinally thereof to form a tube. The lower end of this tube is sealed to close it and liquid is fed in by a pipe from above the position at which the tapes are joined together. If necessary this pipe may project downwardly into the tube to avoid spilling liquid as it is being fed in. The transverse sealing of the tube to divide it into individual containers is then carried out as described above.

In a further alternative arrangement, the tube may be formed from one tape of synthetic thermoplastic material which may be folded longitudinally thereof and the edges joined together in a suitable manner as by heat and pressure for example or by the use of a solvent; in this manner a tube may be made with a single longitudinal seam. In a modified arrangement a tube may be made from a single tape winding it in spiral form so that instead of having one joint extending longitudinally of the tube, the joint is a spiral one and the edges may be secured in any suitable manner for example as described above. In a similar manner a tube may be manufactured by helically winding two or more such tapes, the edges of the tapes being secured together to form a liquid-tight tube. One end of the tube is then closed by sticking together the open end of the tube and the liquid contents are fed into the length of tube so formed through a pipe projecting into the tube as described above. The arrangement is such that the open end of the tube is at a higher level then the members which effect the transverse sealing, and the level of the liquid in the tube may be kept always at approximately the same level and always higher than the transverse sealing position. In this way with each transverse sealing operation to form a container a part of the contents passes into the following section of the tube and this ensures complete filling of each container formed. The transverse sealing may be arranged to take place at right angles to the edges of the tube when there are no special reasons for a different shaping. Some examples of particular shaping of the bottom and of the top end will be given hereinafter.

The above methods are what are called the continuous methods of operation in that starting in the one case from a mass of synthetic thermoplastic material which is extruded to form a tube and in the other case from a tape or tapes of synthetic thermoplastic material which may be formed into a tube, completely filled and formed containers are produced in a sequential series of operations. It is however possible to form the tube of synthetic thermoplastic material either by extrusion or from a tape or tapes and then to store the formed tube on a roller or spool until it is required. This method does however introduce a complication in that in order to fill the tube with the liquid it is necessary either to puncture the tube intermittently or to slit the tube longitudinally, introduce a pipe into the slit and then seal the tube again as will hereinafter be more fully explained.

When dealing with medical ampoules in which sterility is an important feature, however, the continuous method is preferred because it is relatively easy to obtain an extruded tube in a substantially sterile condition in view of the temperature at which it is formed and it is possible to clean and treat the tapes in a suitable manner immediately before formation into a tube.

Referring now in more detail to the transverse sealing operations it may be explained that if it is desired that the contents of the container should be forced out for use gradually in the form of a thin band or rod like tooth paste out of a tube, then the closing of the upper end of a container does not require a straight line but a neck should be formed merging into a tip. Such a shape may be produced by forming a corresponding recess in the bottom of the following container so that each container produced is in shape something like a wine bottle. Such shapes are particularly suitable for contents having a viscous consistency.

In another case for example, the contents may be milk or some similar liquid intended for suckling or infant food, and then the upper closing may be formed like a teat. After the piercing of a few holes in the teat, this can serve at once for the suction of the milk or other liquid contents. The infant can drink the contents without interruption in contrast to the use of glass vessels. In consequence of the collapse of the non-rigid wall there is no need to allow the inlet of air into the vessel.

In another example in the manufacture of ampoules for preserving medicaments for injection, the closing part may be of such shape that a hollow needle can be fitted in the same way as with the injection nozzle.

Containers of other shapes may be manufactured as required.

It will be appreciated that the individual containers as they are formed may remain attached together or they may be divided into entirely separated containers as required. Clearly, many variations are possible, for example a block of interconnected containers may be produced when tubes are divided both transversely and longitudinally into individual containers. This produces a block of containers similar to a slab of chocolate with longitudinal and if necessary also with a number of transverse grooves. If it is desired that such a slab or plate should present a greater bulge on one side than on the other the thickness of the bands to be united can be so chosen that one band bulges out to a greater extent than the other band when the containers are filled.

If the arrangement is such that delivery pipes of different liquids open into the tube during manufacture and if the subdivision in the length is such that by the continuing fusing of the said longitudinal ribs a separation of the different liquids is ensured, then connected containers with different contents can be produced, which is advantageous if a mixture of the contents is only to take place at the moment of use. In the case of ampoules, the physician who takes these contents first pierces the one wall and aspirates the contents, then pierces further into the adjacent ampoule and aspirates its contents, so that the two contents mix in the syringe.

In a large number of cases it is a requirement for one liquid to be combined only at the last moment with a pulverulent substance. This pulverulent material must, in many cases, be kept under vacuum. As it would be contrary to the essence of the invention to fill an ampoule with pulverulent or granular substances and liquid into the adjacent ampoules, it does not appear impossible to keep the pulverulent or granular substance in dry form under vacuum and only at the last moment to place the substance to be dissolved, say, salvarsan, neosalvarsan or other substances which must be secured in the said manner, in a liquid which cannot exert any injurious influence on the preservation of the medicament and if necessary keep the powder not dissolved but in suspension. In this case, as above described, there can be placed in one chamber for instance the aqueous solvent, and in the adjacent chamber the suspension. It has, in fact, been found that the presence of small solid substances, for example, those which can be found in suspension, present no obstruction for the fusing together according to the invention. If the bodies in such cases are not forced into the following ampoule, they are so incorporated by the soft plastic substance wall that they are entirely enclosed. Under certain circumstances, the closing edge or the separation edge must be made sufficiently wide so that the particles do not form a bridge through which a transfer of one content into the other can take place.

Thus, the improved process is suitable not only for homogeneous liquid or pasty masses but also for those which contain small solid particles in suspension.

Summing up at this stage it will be understood that the present invention provides a method of making sealed containers made of synthetic thermoplastic material and completely filled with liquid, that is to say without air therein. Such containers have many uses depending upon the contents. In particular, in the case of ampoules, the wall of the ampoule may be pierced in any place by the needle of a syringe and the medicament withdrawn from the ampoule into the syringe by suction, during which the ampoule collapses as the medicament is withdrawn to prevent formation of a vacuum in the ampoule.

It may also be mentioned that according to the invention the thin walled easily collapsible container can without difficulty be provided with reinforced ribs. This is particularly desirable with containers of larger dimensions such for example as the milk container to be used as a feeding bottle previously mentioned.

For fitting on the reinforced ribs, first the edges formed may be made considerably wider than would be necessary simply for the melting and fusing together, then the edge may be carried along by its outer end on a considerably hotter member which so heats this edge that it fuses. On the fusing, the outer edge contracts in consequence of the surface tension into a thick roll or bead. This bead can be made as thick and thereby as strong as desired, and forms, to a certain extent, a rib for the otherwise very unrigid vessel.

According to a feature of the invention an extruding device is used for making a tube of synthetic thermoplastic material preferably having a thin wall. This extruding device is provided with a hollow die through which liquid, for example, milk, may be fed into the tube while it is being shaped, the arrangement being such that the liquid fills the tube and no air from the outside is permitted to enter. The liquid filled tube which may be formed in a continuous manner by the extruding device may then be allowed to cool, in order to attain a desired degree of plasticity and rigidity. Alternatively in some cases it may be necessary to warm the tube. If the tube is allowed to cool too much it may become too rigid to permit the next steps to be carried out while if it is too warm it may not be rigid enough and therefore there is a range of temperature into which the tube should be brought to give the required degree of rigidity and plasticity for the next steps.

At the proper temperature the tube may then be separated into single containers by the use of heated devices which together may operate to seal the tube transversely as described above to form the end of each container. This sealing or welding device may be shaped in such a way that it creates or forms a bottle neck or other required shape for example a teat. The corresponding bottom of the following bottle or other container may have a concave form where the part which has served for forming the neck, teat or other special shape of the preceding container is missing.

By the other method, containers, e. g., milk bottles, may be filled, sealed and provided in special shapes such as teat ended bottles in a continuous process.

As an alternative method, one, two, or more bands of the synthetic thermoplastic material may be used and formed into a tube in the manner described above. This tube may then be shaped into milk bottles.

When required for use the containers may be warmed or reheated to a desired temperature and in the case of a baby's bottle several small holes may be punctured in the teat. The infant who drinks the milk can empty the whole bottle without swallowing air and the container as it becomes more and more empty collapses, as described above, so that it is unnecessary to let air enter into the bottle in order to avoid a vacuum as in the case of rigid bottles.

It will be understood from the above that this invention provides a method of manufacturing and shaping a hollow container such as a bottle from a mass of synthetic thermoplastic material by extrusion and forming, or from bands of synthetic thermoplastic material, and at the same time filling the container with a liquid such as milk, comprising forming the thermoplastic mass or the bands of material into a tube, introducing the liquid into the tube, then shaping the tube into a container of the desired shape. The method may be a continuous one in which the tube is formed steadily and fed forward to the shaping and sealing device which may operate in such a way that the closing and shaping of the end of a filled container also seals the end of the tube for the following container and expels surplus liquid into the next container, after which more liquid may be allowed to enter the tube and the next filled container may be formed in the same way.

According to a feature of the invention when applying heat to synthetic thermoplastic material by means of heated metal rollers or by other heated surfaces which are liable to stick to the synthetic thermoplastic material, it is proposed to insert a buffer between the hot surface and the thermoplastic material, the said buffer consisting of a layer of other material which is not liable to stick to the synthetic thermoplastic material and which does not act as a heat insulator to any marked extent. For example, if a tape of polythene or other thermoplastic material is being passed over a heated metal roller, a buffer material such as strong paper or cellophane may be inserted between the roller and the thermoplastic material. This buffer layer may consist of a strong paper cloth or fabric tape corresponding to the tape of synthetic thermoplastic material so that the tapes may be fed forward together with the paper tape between the thermoplastic tape and the heated metal roller. In this way considerable heat may be applied to the synthetic thermoplastic material by means of hot metal rollers without causing the synthetic thermoplastic material to stick to the rollers. If the tape of synthetic thermoplastic material or two or more such tapes are to be passed between two hot metal rollers, then two buffer tapes may be used to prevent direct contact between synthetic thermoplastic material and the hot metal.

As an alternative way of carrying the invention into effect when using heated metal rollers in relation to synthetic thermoplastic material, the buffer material may be applied in the form of a coat or sheath to the rollers in such a way that the rollers are encased in material which is not liable to stick to the synthetic thermoplastic material. This feature of the present invention may be used with advantage in connection with the manufacture of ampoules and other small containers by the method outlined above which may involve passing the tape or tapes over heated rollers and in which heat must be applied to seal the edges of the containers. For example, when two tapes are used the tapes may be joined by sealing longitudinally along the sides, and the tapes thus joined may then be sealed transversely at the requisite intervals to form the individual containers. In the above method whenever hot metal rollers or hot metal surfaces are used, a buffer layer may be interposed in the manner described above. If desired for certain containers the buffer layer itself may be caused to stick to the synthetic thermoplastic material so that the finished product comprises the synthetic thermoplastic material combined with a layer of fibrous material or paper or other buffer material adhering thereto.

Other objects and advantages of the invention will appear hereinafter.

In the drawings,

Fig. 1 is a diagrammatic view of a machine according to and for carrying out the present invention, and illustrating the apparatus in side elevation, parts being in section;

Fig. 2 is a view of the apparatus of Fig. 1 in front elevation, looking in the direction of arrow 2 in Fig. 1; and Fig. 3 is a view similar to Fig. 1 but showing a modification.

In the drawings, reference numerals 1 and 2 indicate spools of thermoplastic synthetic resin in tape form and 3 and 4 indicate spools of buffer material to prevent the tapes adhering to the heated metal rollers 9 and 10. The tapes from spools 1, 2, 3 and 4 are unwound from the spools and are passed around guide rollers 5 and 6 below which a liquid feed pipe 7 is introduced between the tapes. This feed pipe 7 is provided with an elbow 8 at which point the pipe is turned downwardly so that liquid may be delivered into the tube 11 which is formed from the tapes 1 and 2, without risk of spilling or waste. Rollers 9 and 10 are heated sealing rollers adapted to seal the sides of the tapes from spools 1 and 2 longitudinally, to form the tube 11 which is extended downwardly between guides 12 to transverse sealing rollers 13, 14 which seal the tube transversely below the liquid surface to produce completely filled containers. These rollers 13, 14 divide the tube transversely into individual containers 15, 16 which are attached to one another at the seals as shown, and these containers 15, 16 may then be passed to rollers 17 and 18 which, if present, divide the tube longitudinally as described above. If desired, the machine may be enclosed with a cover, not shown, to keep out dust and dirt, and if necessary the tapes may be passed through a suitable antiseptic bath before reaching the rollers 5 and 6. In Figure 3 a preformed tube 19 of synthetic thermoplastic material is unwound from a drum 20 and is passed downwardly between two cutting rollers 21, 22 which open up the tube along one side by slitting it open and removing a waste strip. The liquid feed pipe 7 is introduced through the slit as shown and is turned downwards at the elbow 8 as described above. The slit tube is then passed between sealing rollers 23 and 24 which seal the slit in the tube. It will be understood therefore that the preformed tube is slit open, the feed pipe is introduced through the slit and the tube is then sealed up again. The filled tube is then passed through the transverse sealing rollers 13, and 14 and the longitudinal sealing rollers 17 and 18 as described above, if desired.

In accordance with this method a tube of synthetic thermoplastic material may be made by extrusion, for example, at 120° C. This tube may then be flattened and wound on to the storage roller 20 in one length. The inside of this tube will be as near to sterility as it is possible to obtain, in view of the temperature at which the tube is extruded.

The pipe 7 may be made of glass, metal, rubber or other suitable material and the open end of the pipe 7 is as described to form an elbow so that the opening in the pipe is below the position at which reforming of the tube takes place. In this way the fluid contents may be fed into the tube below the resealing position. The filled tube is then subdivided transversely and if desired also longitudinally as described to form individual containers which may be joined to the adjacent containers or may be separate. The transverse sealing is effected below the fluid surface to ensure that completely filled containers are made, the excess from one container being forced out into the one above during sealing.

If a large tube is being used, and the containers required are small, then suitable longitudinal division of the tube may be effected as described above to divide the tube into the required number of sections longitudinally. This may be effected by heated knives, rollers or the like, to give a continuous method. Alternatively an intermittent method may be used but the continuous method is preferred because it is important that the device for transverse sealing remains in contact with the material for about the same length of time at each sealing operation and this can more easily be arranged in a continuous process by having a star or like shaped heated roller rotating at the same speed as the advancement of the tube.

Experiments have shown that these synthetic thermoplastic materials such as polyethylene usually called polythene, are not water vapour proof but, on the other hand considerably less water vapour evaporates through the walls of a filled container when the container is completely filled and there is no air bubble within the container. The transverse sealing under the level of the fluid ensures as far as possible that no air bubbles are present which is also desirable from the medical point of view and is difficult to achieve with normal glass ampoules.

If arrangements are made to feed the tube through the machine always at the same speed and if the deformation of the walls of the tube is controlled as by an outer mould, then within limits the contents of the containers will always be the same. The pressure exerted by the fluid column may be maintained constant by a device such as an autostat.

To avoid shrinkage of the material during subsequent final sterilization it is advisable, after sealing off individual containers, to remove any unwanted border of material around the container or containers; this may be effected by heated knives.

It will be appreciated that the above described methods for making and filling these containers are given by way of example and various alternative methods are possible, for example, the extruded tube may be cut open on both sides and may then be resealed along both sides in order to give a symmetrical container, but, of course, in this case the filling pipe is introduced from one side only.

It may be mentioned that it is an advantage to make the sealing seams, longitudinal and transversal, between adjacent containers as narrow as possible consistent with obtaining a satisfactory seal. Not only does this save material and give containers of good appearance but it also minimises distortion of the material which may be caused if large flaps remain at the ends and sides of the containers. This distortion of the material may take place when filled ampoules are subsequently heat sterilized and therefore in ampoules constructed according to the invention it is particularly important not to allow wide sealing seams to remain. It is therefore an advantage to make the seals between adjacent containers narrow and also to provide a narrow seam or seams when a tube is made out of a tape or tapes and it may also be advantageous when effecting the longitudinal and transverse sealing to separate the individual containers at the same time. To achieve this the sealing rollers at each projection may have a central raised part for cutting and narrow lateral projections for sealing. Preferably the synthetic thermoplastic material used for making these containers is very thin, for example, sheets of polythene of 3 to 4 thousandths of an inch gives very satisfactory results and the thinness of this material facilitates sealing. It will be understood however that thicker material may be used if desired.

What I claim is:

1. A method of making and filling liquid containers of the kind referred to comprising the steps of moving downwardly a preformed tube of synthetic thermoplastic material closed at the lower end, slitting the tube longitudinally thereof, feeding liquid into the tube through the slit, resealing the slit in the tube and then sealing the tube transversely at spaced positions in order to divide the tube into a number of individual containers, each successive sealing operation being effected below the surface of the liquid in the tube so that excess liquid from one container is forced out into the next container above.

2. A machine for making and filling liquid containers comprising means for unwinding a tube of synthetic thermoplastic material, means for slitting the tube longitudinally, means for sealing the lower end of the tube, means for feeding liquid into the tube through the slit, means resealing the slit tube, and means for sealing the tube transversely thereof at spaced positions in order to divide the tube into a number of individual containers, each successive transverse sealing operation being effected below the surface of the liquid in the tube so that excess liquid from one container is forced out into the next container above.

3. A machine according to claim 2 including means for sealing the tube longitudinally intermediate the edges thereof to increase the number of containers produced.

4. A machine according to claim 2 including means supplying buffer material between the sealing means and the synthetic thermoplastic material.

5. The method of claim 1 including sealing the tube longitudinally to divide the same into a plurality of lines of successive containers.

6. The method of claim 1 including sealing the tube longitudinally to divide the same into a plurality of lines of successive containers prior to the transverse sealing step.

7. A method of making and filling liquid containers of the kind referred to comprising the steps of moving downwardly a preformed tube of synthetic thermoplastic material closed at the lower end, slitting the tube longitudinally thereof, feeding liquid into the tube through the slit, resealing the slit in the tube and then sealing the tube transversely at spaced positions in order to divide the tube into a number of individual containers, and maintaining the surface of the liquid in the tube above the location of each sealing operation.

8. The method of claim 7 including the step of continuously longitudinally sealing the tube in spaced lines and thereby controlling the effective width and capacity thereof.

FELIX MEYER.

REFERENCES CITED

The following references are of record in the file of this patent:

UNITED STATES PATENTS

| Number | Name | Date |
| --- | --- | --- |
| 1,943,101 | Wheatley | Jan. 9, 1934 |
| 1,949,175 | Netzel | Feb. 27, 1934 |
| 2,113,658 | Lakso | Apr. 12, 1938 |
| 2,166,643 | Salfisberg | July 18, 1939 |
| 2,279,505 | Ravenscroft | Apr. 14, 1942 |
| 2,290,199 | Moule | July 21, 1942 |
| 2,317,687 | Larchar | Apr. 27, 1943 |
| 2,318,718 | Scherer | May 11, 1943 |
| 2,323,581 | Weckesser | July 6, 1943 |
| 2,363,051 | Dosmann | Nov. 21, 1944 |
| 2,390,337 | Spotz | Dec. 4, 1945 |
| 2,420,983 | Salfisberg | May 20, 1947 |
| 2,449,139 | Posner | Sept. 14, 1948 |
| 2,484,965 | Slaughter | Oct. 18, 1949 |

FOREIGN PATENTS

| Number | Country | Date |
| --- | --- | --- |
| 612,445 | Great Britain | Nov. 12, 1948 |